United States Patent
Bakke et al.

(10) Patent No.: US 10,201,248 B2
(45) Date of Patent: Feb. 12, 2019

(54) COFFEE GRINDING MACHINE

(71) Applicant: La Marzocco S.r.l., Scarperia (FI) (IT)

(72) Inventors: Kent Bakke, Seattle, WA (US); Jacob Ellul-Blake, Seattle, WA (US)

(73) Assignee: LA MARZOCCO S.r.l, Scarperia (FI) (IT)

(*) Notice: Subject to any disclaimer, the term of this patent is extended or adjusted under 35 U.S.C. 154(b) by 353 days.

(21) Appl. No.: 14/912,655

(22) PCT Filed: Aug. 20, 2014

(86) PCT No.: PCT/EP2014/067758
§ 371 (c)(1),
(2) Date: Feb. 18, 2016

(87) PCT Pub. No.: WO2015/028372
PCT Pub. Date: Mar. 5, 2015

(65) Prior Publication Data
US 2016/0192809 A1     Jul. 7, 2016

(30) Foreign Application Priority Data
Aug. 29, 2013   (IT) .............................. MI2013A1423

(51) Int. Cl.
*A47J 42/40*     (2006.01)
*A47J 42/08*     (2006.01)
(Continued)

(52) U.S. Cl.
CPC .............. *A47J 42/40* (2013.01); *A47J 42/02* (2013.01); *A47J 42/06* (2013.01); *A47J 42/08* (2013.01); *A47J 31/42* (2013.01); *A47J 42/10* (2013.01)

(58) Field of Classification Search
CPC .. A47J 42/40; A47J 42/06; A47J 42/02; A47J 42/08; A47J 42/10; A47J 42/00
See application file for complete search history.

(56) References Cited

U.S. PATENT DOCUMENTS 5,950,941 A * 9/1999 McNeill .................. A47J 42/40
                                                                241/100
6,595,445 B2 * 7/2003 Fagan .................... A47J 42/40
                                                                241/186.3
(Continued)

FOREIGN PATENT DOCUMENTS

FR           2313849 A7 * 12/1976 .............. A47J 42/06
WO      2006/133699 A2    12/2006
(Continued)

OTHER PUBLICATIONS

International Search Report dated Jan. 27, 2015 in PCT/EP2014/067758 Filed Aug. 20, 2014.

*Primary Examiner* — Faye Francis
(74) *Attorney, Agent, or Firm* — Oblon, McClelland, Maier & Neustadt, L.L.P.

(57) ABSTRACT

A coffee grinding machine including a first burr and a second burr. At least one of the first burr and the second burr is rotatable about an axis of rotation, the burrs being mutually cooperating to grind coffee. The machine includes a motor which rotates at least one of the burrs with respect to the other, wherein the axis of rotation of the motor does not coincide with the axis of rotation of the burrs so that the coffee which is ground by the grinders is directed to an output of a conveyor cone for use thereof.

13 Claims, 6 Drawing Sheets

(51) Int. Cl.
*A47J 42/02* (2006.01)
*A47J 42/06* (2006.01)
*A47J 42/10* (2006.01)
*A47J 31/42* (2006.01)

(56) References Cited

U.S. PATENT DOCUMENTS

| | | | |
|---|---|---|---|
| 7,464,888 B2* | 12/2008 | Malykke | A47J 42/40 |
| | | | 141/360 |
| 2009/0127363 A1* | 5/2009 | Malykke | A47J 31/404 |
| | | | 241/248 |
| 2013/0082130 A1* | 4/2013 | Hulett | A47J 31/42 |
| | | | 241/277 |
| 2015/0157167 A1* | 6/2015 | Eicher | A47J 31/42 |
| | | | 99/286 |

FOREIGN PATENT DOCUMENTS

| | | |
|---|---|---|
| WO | 2009/112034 A1 | 9/2009 |
| WO | 2011/067116 A1 | 6/2011 |

\* cited by examiner

COFFEE GRINDING MACHINE

The present invention relates to a machine for grinding coffee beans. The machine for grinding coffee beans may be a separate machine or may be incorporated in an at least partly automatic machine for the production of coffee-based beverages. Such a machine is also known simply as a "coffee grinding machine", "coffee grinder" or "mill".

Two categories of coffee grinder are known: one category uses volumetric dosing and has a storage tank, while the other category is of the "on demand" type, i.e. with instantaneous dosing and no storage of ground coffee. The present invention relates to both categories of machine, but preferably to coffee grinding machines of the "on demand" type, i.e. with instantaneous dosing and no storage of ground coffee.

Coffee grinding machines comprising a body housing two superimposed grinders, one of which is rotationally operated by an electric motor, and the other one of which is movable axially with respect to the first one upon operation of a threaded ring engaging inside the grinder seating body, are known.

In these known machines, the continuity and the adjustment of the degree of grinding is obtained by means of the threaded connection, which allows axial movement of the grinders towards and away from each other, and a system of elastic members which allow recovery of the play.

WO2011067116 describes a system for adjusting a coffee grinder.

The known coffee grinding devices comprise two burrs which are positioned above an electric motor. One of the two burrs is rotated directly by the electric motor or rotated via gears. Generally, the fixed burr is the upper burr, while the lower burr is the motor-driven grinder. Once the coffee has been ground, it is conveyed from the grinding chamber to the output duct through a tunnel until it reaches a dosing or dispensing chamber.

The size of the tunnel and the speed of the flow affect the density of the ground coffee flow. In fact, it is known that a tunnel, especially if it is not designed with a suitable size for the productivity of the grinders, may increase or decrease the density of the flow of the ground coffee.

In any case, the Applicant has noted that the current devices for grinding coffee beans "on demand" with instantaneous dosing and no storage have the drawback that particles of ground coffee tend to adhere to the walls of the tunnel, and the same tunnel at the end of each grinding cycle remains full with already ground coffee powder. Thus, part of the ground coffee does not reach the dosing or dispensing chamber and cannot be used for preparation of the beverage (espresso coffee or the like). This problem in turn involves a series of drawbacks.

A first drawback consists in the presence of harmful spaces or areas where the ready ground coffee accumulates and over time deteriorates, contaminating the instantaneously ground fresh coffee.

A second drawback is that the variation in density of the ground coffee (and therefore the quantity of ground coffee) due to the cross-section of the tunnel and its length results in a discontinuous dose reaching the dispensing zone. Encrusted coffee remains may also become detached from the walls of the tunnel.

A third drawback is that the tunnel must be cleaned frequently because the ground coffee adhering to the tunnel wall deteriorates and must be removed. If it is not removed, the stale ground coffee imparts an unpleasant taste to the ground coffee passing through the tunnel. An obstruction of the tunnel may also occur following an accumulation of already ground coffee, especially if it is finely ground.

One object of the present invention is to provide a machine for grinding coffee beans which eliminates or at least reduces at least some of the aforementioned drawbacks caused by the presence of the tunnel. In the machine according to the present invention, no connecting tunnel is envisaged between the grinding chamber and the output duct. In this way any drawback associated with adhesion of the ground coffee to the walls of the tunnel and any risk of obstruction of the said tunnel is avoided.

The Applicant has also noted that when a coffee bean is broken an electrostatic charge is created. When a bean is divided into smaller parts, application of a greater energy (for example rotating the grinders more rapidly) creates a greater friction and this produces a greater electrostatic charge. This ionization condition causes the ground coffee powder to adhere to the walls of the output duct and cause dispersion of the ground coffee powder outside of the chamber for dispensing thereof. The Applicant has therefore noted that this phenomenon of electrostatic charges results in the stagnation of ground coffee in zones which are difficult to clean and in the wastage of ground coffee powder.

The Applicant has realized that a reduction in the stagnation of ground coffee may be obtained also by reducing the electrostatic charge of the ground coffee powder.

In particularly advantageous embodiments of the present invention a machine for grinding coffee beans is provided, wherein a flexible, programmable and adjustable electric system is present, said electric system, by means of variation of parameters such as voltage and/or current, optimizes the effect of elimination of the electrostatic charges present in the ground coffee powder.

Moreover, the Applicant has noted that the current machines for grinding coffee beans "on demand" with instantaneous dosing and no storage perform dosage on a time basis, without any effective check as to the volume of coffee dispensed. With this method of controlling the grinding time the number of revolutions of the grinders for each cycle is not certain and repeatable and therefore the dose of ground coffee powder which reaches the dispensing chamber is not certain.

Particularly advantageous embodiments of the present invention provide a machine for grinding coffee beans with a device designed to program and control the dose of ground coffee powder by means of the programming and control, for example, of the number of revolutions of the movable grinder or the motor.

According to a first aspect the present invention provides a coffee grinding machine comprising a first burr and a second burr, wherein at least one of the first burr and the second burr is rotatable about an axis of rotation, wherein said burrs are mutually cooperating to grind coffee, wherein said machine comprises a motor which rotates at least one of the burrs with respect to the other one, wherein the axis of rotation of said motor does not coincide with the axis of rotation of the burrs so that the coffee which is ground by the burrs is directed to an output of a cone conveyor for use thereof.

In some embodiments, the axis of rotation of the motor is parallel to the axis of rotation of the burrs and the rotational motion of the motor is transmitted to one of the burrs by means of a transmission member.

In advantageous embodiments, the machine also comprises anti-static means to reduce or eliminate the static charge of the ground coffee.

The anti-static means may comprise an annular member positioned downstream of the burrs, at the mouth of the outlet cone.

The annular member may comprise discrete anti-static elements. These discrete elements, or at least some of them, are directed towards the axis of the cone. The discrete elements may be in the form of pointed metal elements.

The anti-static member may be at least partially made of a plastic material having a high density, low porosity and low electrical conductivity. The discrete anti-static elements may be advantageously connected electrically together with a power supply system.

The power supply system may comprise an AC high voltage generator.

The male burr is displaceable relative to the female burr by means of a rotatable adjustment member.

Advantageously, with the machine according to the invention, the dose of ground coffee is prepared on the basis of a predefined number of revolutions of the motor and/or of the movable burr and not on the basis of the grinding time (i.e. not on the basis of the fact that the burrs are operated for a given time).

According to a second aspect the invention provides a coffee grinding machine comprising a first burr and a second burr, wherein at least one of the first burr and the second burr is rotatable about an axis of rotation, wherein said burrs are mutually cooperating to grind coffee, wherein said machine comprises a motor which rotates at least one of the burrs with respect to the other one, wherein the coffee which is ground by the burrs is directed to an output for use thereof, wherein the machine also comprises anti-static means to reduce or eliminate the static charge of the ground coffee.

The present invention will become clearer from the following description, provided by way of a non-limiting example, to be read with reference to the accompanying drawings, in which.

As mentioned above, when the coffee beans are ground, a strong charge is created as a result of the rapid flow of particles of coffee which are electrostatically charged when they rub against each other and when the particles rub with the teeth of the burrs and the inner walls of the grinding chamber and the output ducts.

According to embodiments of the present invention, in order to obtain the same dose of coffee with repetition of each grinding process, and in order to minimize the formation of coffee agglomerations, an ionizing ring electrode has been provided.

According to embodiments, the ring electrode has been designed to be mounted inside the coffee grinding machine after the grinding mechanism. The ionizing electrode, as clarified better below, is powered by an AC voltage source since positive charges and negative charges are always present in this type of process.

An AC high voltage source with a voltage of 4-10 kilovolts, a high-voltage cable and ionizing ring electrode are preferably provided. The ring electrode has a number of pointed pins which may be regarded as being electrodes situated at different points, but powered by the same high voltage source. A high ohmic resistance is mounted between the high voltage source and the electrodes so as to reduce the overall current and avoid short-circuiting of one or more electrodes, owing to humidity or other conductive contaminants.

The accompanying figures are simplified and partial views of a coffee grinding machine (or parts thereof) according to an embodiment of the present invention. These views do not show any components such as, for example, the electric motor, the support base and the top hopper which typically contains and conveys the coffee beans to be ground towards the grinding chamber.

Figure 1:
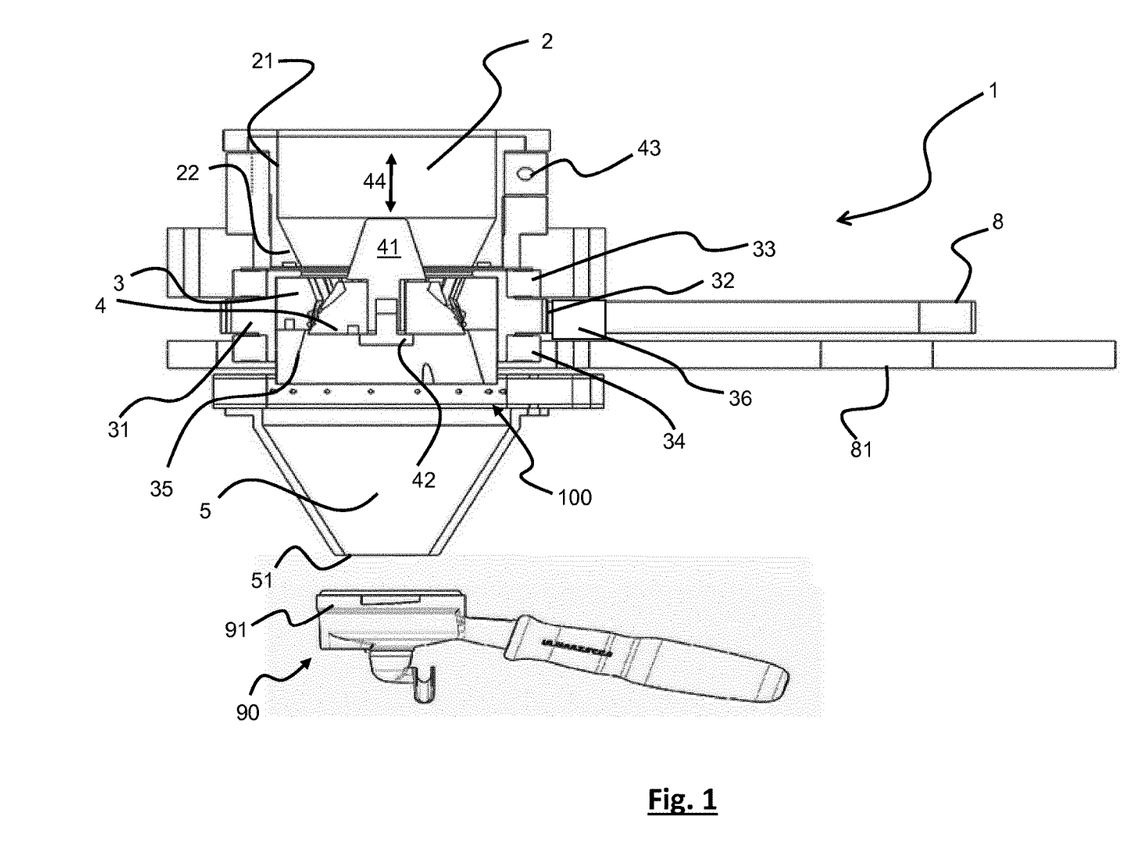
FIG. 1 is a simplified and partial cross-sectional view of a machine according to an embodiment of the invention.

The machine 1 comprises a grinding chamber with a top inlet 2 for the coffee to be ground, a female burr 3 and a corresponding male burr 4 cooperating with the female burr 3 and an output conveyor cone 5 which receives the ground coffee from the burrs 3 and 4 and conveys it so as to be collected and used. For example, as shown in FIG. 1, the ground coffee may be conveyed towards a filter 91 supported by a filter holder 90 of a known type.

Preferably, the top inlet chamber 2 comprises an upper cylindrical part 21 and a lower frustoconical part 22 which conveys the coffee to be ground towards the burrs 3,4. The top inlet chamber 2 may be made of a metallic material, such as aluminium, steel or alloys thereof or a plastic material such as polyethylene or polyethylene terephthalate.

According to a preferred embodiment of the present invention, the male burr 4 is a fixed burr, while the female burr 3 is movable and rotatable. As will be clarified below, the male burr 4 cannot rotate, but is able to translate axially so as to allow adjustment of the grinding action, as indicated in FIG. 1.

Figure 3:
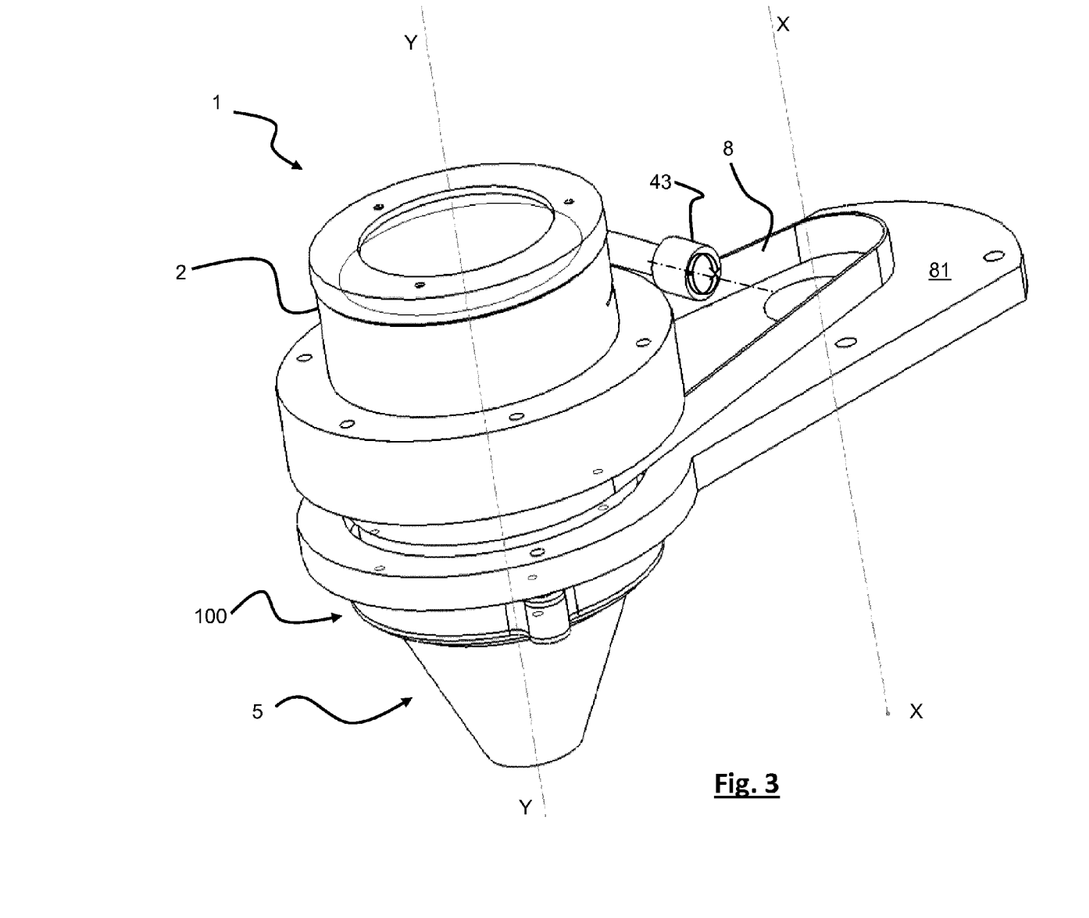
FIG. 3 is non-sectioned simplified view of the machine according to FIG. 1.
Figure 4:
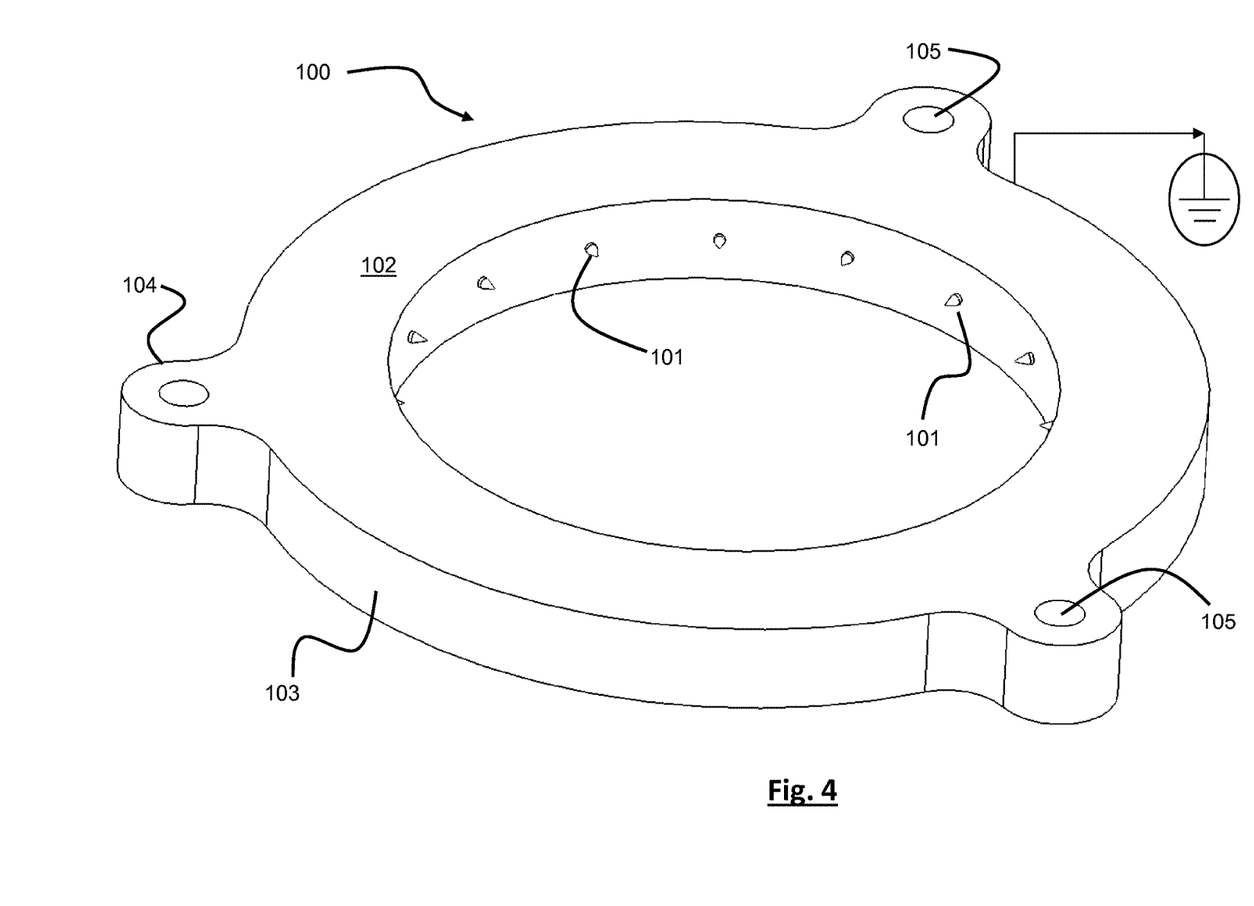
FIG. 4 is an axonometric view of an anti-static ring.

Preferably, the movable burr 3 is integral with a movable female burr holder 31. The female burr holder 31 is substantially cylindrical and comprises, on its outer surface, an annular projection 32. The annular projection 32 projects radially outwards and is configured to be engaged by a belt 8 or a drive chain. Thus, the annular projection 32 may comprise a recess for guiding the drive belt 8 or teeth for engaging with a drive chain. The drive chain 8 is an endless belt rotated by means of an electric motor. The electric motor is not shown in the Figures, but a support 81 suitable for supporting it in a fixed manner is shown in diagrammatic form. In any case, according to one embodiment (that shown in the Figures), the axis of rotation X-X of the electric motor is different from the axis of rotation Y-Y of the burrs 3, 4 (FIG. 3).

The female grinder holder 31 is preferably supported between two ball bearings 33, 34.

As mentioned above, the male burr 4 is preferably the fixed burr, which is locked by means of a suitable clamping member, indicated by the numbers 41 and 42. Preferably an adjustment system is also provided, said adjustment system comprising an adjusting screw 43 which displaces the clamping member 41, 42 so that the male burr 4 moves towards the female burr 3 or moves away from it. The translational movement is indicated by the double-headed arrow 44.

In one embodiment of the present invention, integral with the inner bottom part of the female grinder holder 31 there is a conveyor ring 35 for conveying the ground coffee towards the conveyor cone 5. Preferably the conveyor ring

35 is a frustoconical annular body with a smaller diameter substantially corresponding to the diameter of the burrs 3, 4 and with a larger diameter towards the output cone 5. Therefore, the conveyor ring 35 has a form open downwards towards the conveyor cone 5.

Preferably, the conveyor cone 5 is a converging conical body which tapers towards the outlet. Advantageously, the conveyor cone 5 may be made of a material having a low porosity and low coefficient of friction. For example, it may be made of metallic material, such as aluminium, steel or alloys thereof, or more preferably a plastic material such as polyethylene or polyethylene terephthalate.

According to the present invention, the machine comprises means 100 for reducing or eliminating the static charge of the ground coffee. Preferably, these anti-static means 100 are positioned downstream of the grinders 3, 4. Preferably, these anti-static means 100 are positioned upstream of the output opening 51 of the conveyor cone 5. More preferably, these anti-static means 100 are positioned substantially at the inlet mouth of the conveyor cone 5, for example at about 30 mm from the bottom bearing.

In one embodiment, the anti-static means 100 comprise a ring with discrete anti-static elements 101. These discrete elements 101, preferably, are pointed metal elements. The pointed metal elements 101 are preferably directed towards the axis of the conveyor cone 5.

Preferably, the discrete elements 101 are equidistant. Preferably, the discrete elements are at a radial distance from each other of between about 15° and about 25°, more preferably between about 20° and about 25°. In a preferred embodiment they are at about 22° from each other.

Preferably, the discrete elements are conical elements with a base having a diameter of about 1 mm and height of about 2 mm. In some embodiments, all the discrete elements are identical to each other. In other embodiments, one discrete element 101 is different (in terms of form and/or size and/or material) from the discrete element which is circumferentially adjacent.

As shown in the Figures, the anti-static ring 100 has preferably a diameter greater than the diameter of the conveyor ring 35.

Therefore, the ground coffee output from the burrs 3, 4 is directed, by means of the conveyor ring 35, towards the projecting discrete elements 101 of the anti-static ring 100.

In one embodiment, the discrete elements 101 are pointed tips which are preferably gold-coated and the static charge is created by charging the tips with a voltage, for example, of between 4 kilovolts and 10 kilovolts. More preferably, the static charge is created by charging the tips with a voltage of about 4 kilovolts.

The ring 100 may be advantageously made of a plastic material having a high density, low porosity and low electrical conductivity such as, for example, polyethylene terephthalate PETP and the discrete elements may be fixed to the ring by means of interference in a radial position and electrically connected together with a power supply system.

In the embodiment shown, the ring 100 is a solid body with a flat surface 102 and a side surface 103 which forms three lugs 104. For each lug a through-hole 105 is provided for fixing to the remainder of the machine by means of threaded members (not shown), such as screw, bolts or stay bolts.

Figure 5:
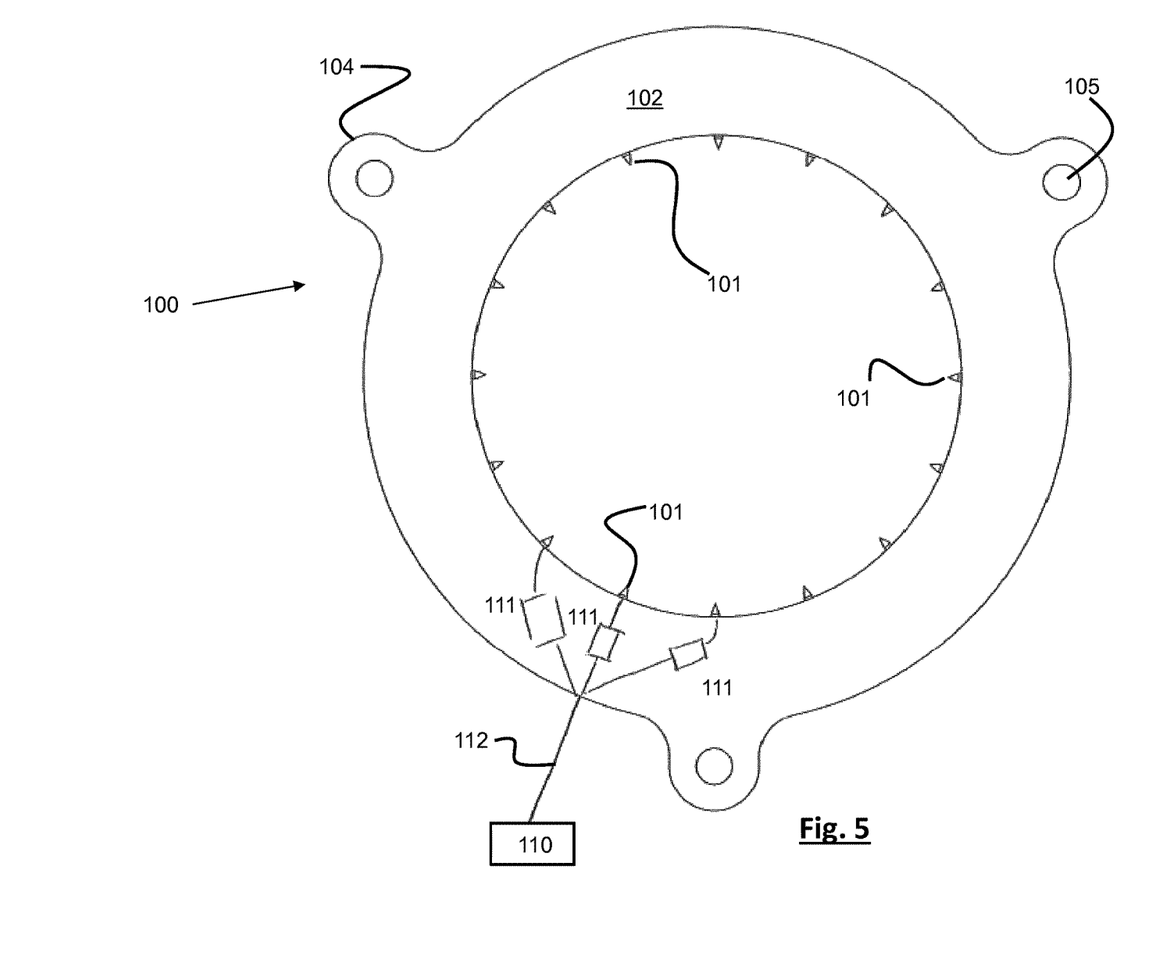
FIG. 5 is a plan view of the anti-static ring with the generator connected to the resistors and pointed elements.

FIG. 5 illustrates in diagrammatic form how the discrete elements may be connected to a generator 110. Preferably the generator 110 is an AC high voltage generator. As mentioned above, the voltage supplied may be between 4 and 10 kilovolts.

Preferably, resistors 111 are arranged between the generator 110 and the discrete elements 101.

FIG. 5 shows only three connections to the discrete elements 101, but it is evident that all the discrete elements are connected electrically to the generator 110, preferably by means of a respective resistor 111.

The Applicant has noted that the projecting discrete elements 101 thus configured are effective for directing the ground coffee towards the centre of the conveyor cone 5 and therefore away from the walls of the said conveyor cone. In this way, substantially all the ground coffee reaches the output mouth 51 of the conveyor cone 5, does not adhere to the walls of the conveyor cone, but falls centrally without striking the wall of the conveyor cone.

The Applicant has noted that the projecting discrete elements 101 thus configured are effective for reducing the dispersion of the ground coffee powder in the area outside of the cone 5 and for concentrating it towards the filter 91.

Figure 6:
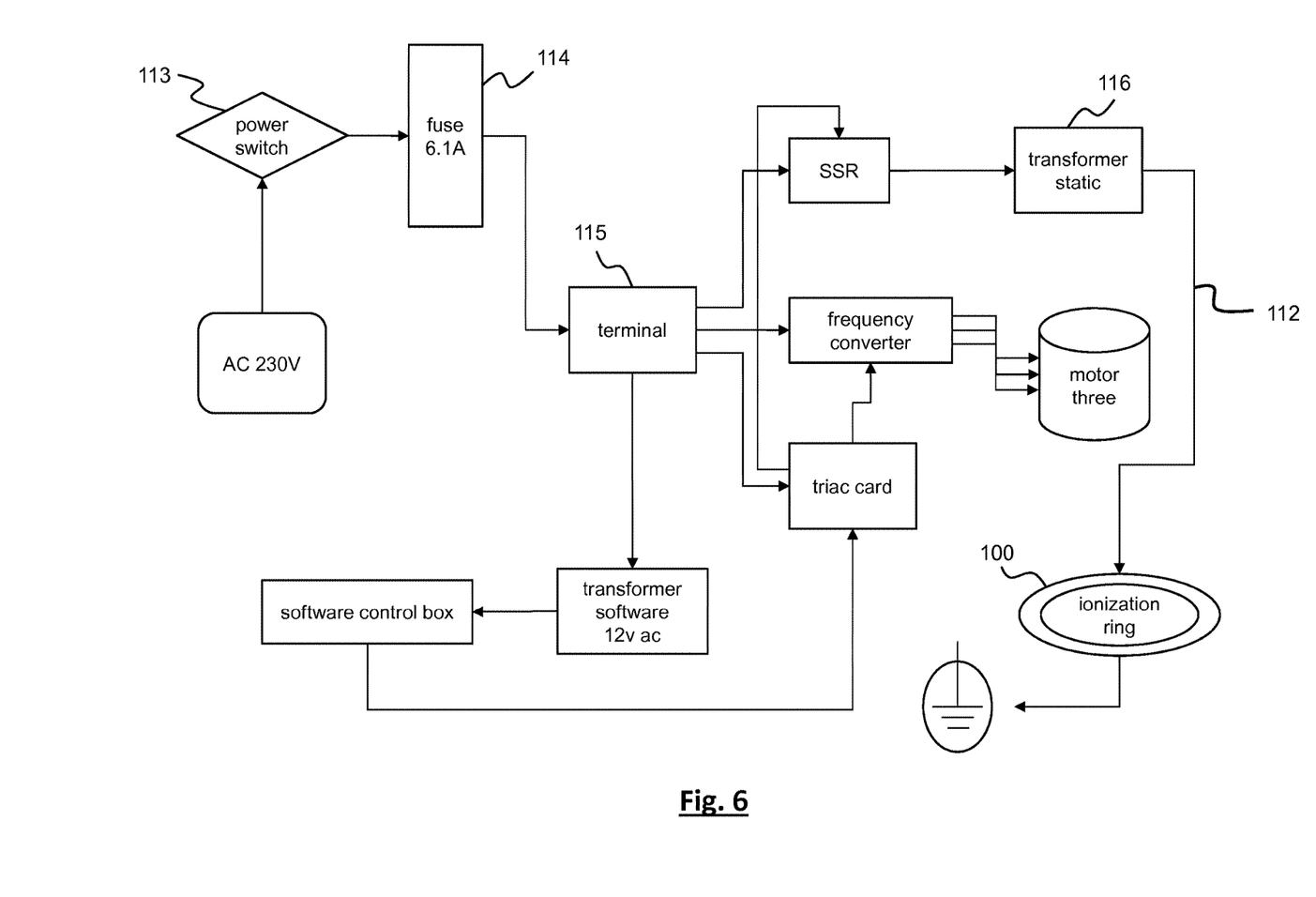
FIG. 6 is an electrical diagram, which shows, in addition to other components, the power supply of the pointed elements of the anti-static ring.

FIG. 6 shows in diagrammatic form an example of the electric circuit suitable for powering the anti-static ring 100. FIG. 6 shows the AC power supply, a main switch 113, a fuse 114, a terminal 115, resistors 111 (visible in FIG. 5) and a static voltage converter 116 (for varying the voltage entering the anti-static ring 100) which is connected to the ring 100 preferably by means of a high-voltage cable 112. The figure also shows the earth connection of the ring 100.

The abbreviation "SSR" indicates a solid-state relay for controlling the power supply of the ring. The assembly consisting of fuse 114, terminal 115, SSR relay and transformer 116 form essentially the component 110 of FIG. 5.

The amount of ground coffee obtained by means of the machine according to the present invention substantially corresponds to the amount of coffee introduced into the grinders. This is due to the fact that only a minimum and negligible amount of ground coffee adheres to the wall of the output cone 5 or is dispersed into the area outside of the filter 91. Moreover the connection tunnel between the grinding chamber and the metering or dispensing chamber is also not present.

Figure 2:
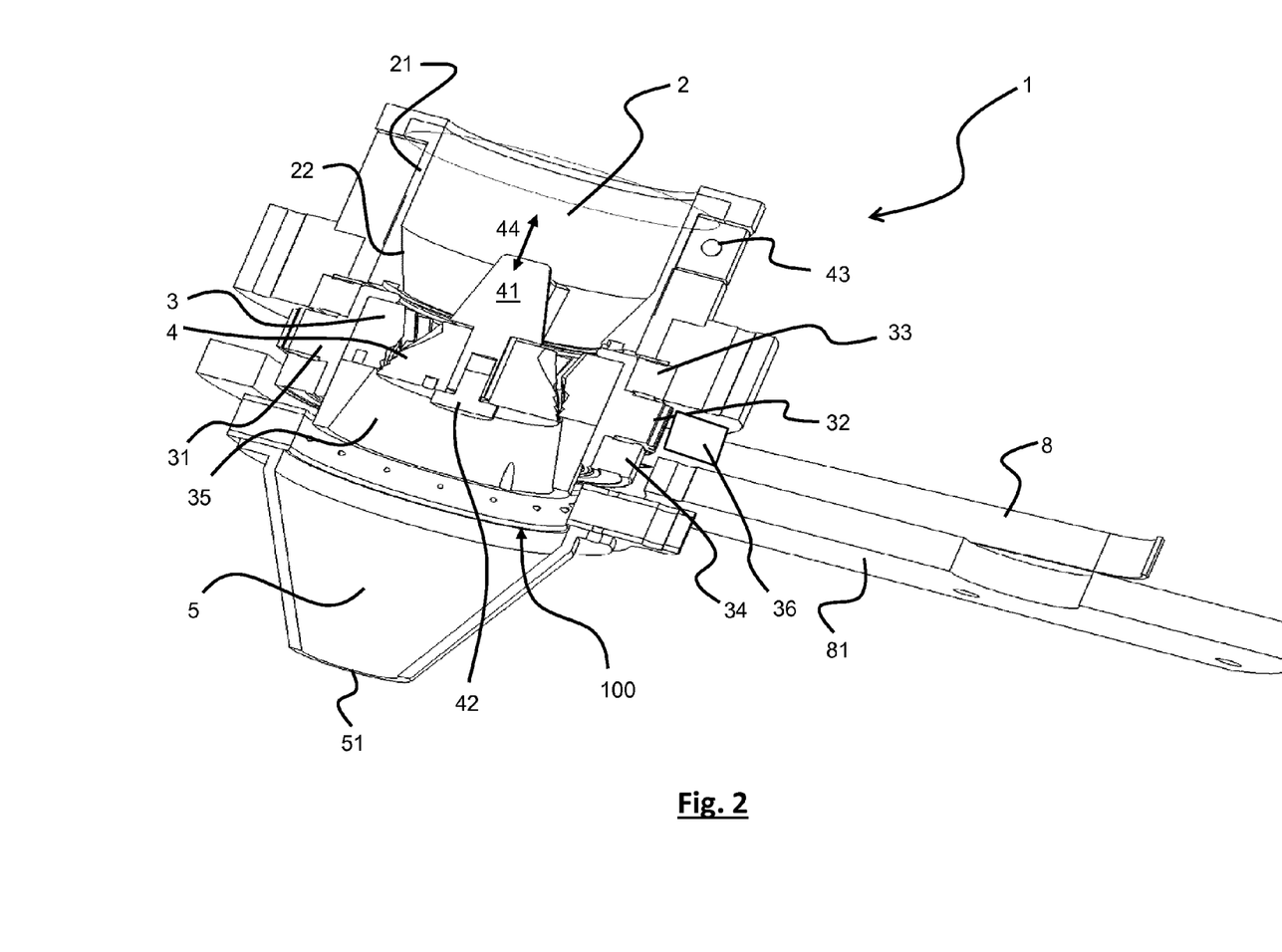
FIG. 2 is a different view of the cross-section shown in FIG. 1.

In order to prepare a dose of ground coffee, the electric motor may be operated for a certain number of programmable and controlled revolutions. For example, about 10-15 revolutions for a dose equivalent to 7 grams of coffee. A device 36 for programming and controlling the number of revolutions preferably of the movable grinder or the motor by means of, for example, an encoder or a Hall effect device is shown in FIGS. 1 and 2.

Owing to the substantial equivalence between the amount of coffee to be ground which is introduced into the grinders and the ground coffee which is obtained at the cone output, and also owing to the optional anti-static electric device, which results in a negligible amount of dispersed coffee powder, and the optional device for programming and controlling the number of revolutions of the grinders, the repeatability of the dose of ground coffee obtained inside the dispensing chamber 91 is ensured.

The invention claimed is:

1. A coffee grinding machine comprising:
   a conveyor cone configured to output ground coffee via an output;
   a first burr and a second burr, wherein at least one of the first and second burrs is rotatable about an axis of rotation, wherein the first and second burrs are mutually cooperating to grind coffee;
   a motor which rotates at least one of the first and second burrs with respect to the other one, wherein an axis of rotation of the motor does not coincide with the axis of rotation of the first and second burrs so that coffee which is ground by the first and second burrs is directed to the conveyor cone for output via the output of the conveyor cone; and anti-static means for reducing or eliminating static charge of the ground coffee, wherein the anti-static means includes an annular member positioned downstream of the first and second burrs, and a plurality of discrete anti-static elements on an inward-facing inner surface of the annular member.

2. The coffee grinding machine according to claim 1, wherein at least some of the discrete elements on the inner surface of the annular member are directed towards a central axis of the conveyor cone.

3. The coffee grinding machine according to claim 1, wherein the discrete anti-static elements are metal elements.

4. The coffee grinding machine according to claim 1, wherein the discrete anti-static elements are pointed elements.

5. The coffee grinding machine according to claim 1, wherein the discrete anti-static elements are spaced substantially equidistant about the inner surface of the annular member.

6. The coffee grinding machine according to claim 1, wherein the annular member is at least partially made of plastic material having a predetermined density, a predetermined porosity, and a predetermined electrical conductivity, and wherein the discrete anti-static elements are electrically connected to a power supply system.

7. The coffee grinding machine according to claim 6, wherein the power supply system comprises an AC high voltage generator.

8. The coffee grinding machine according to claim 1, wherein the axis of rotation of the motor is parallel to the axis of rotation of the first and second burrs, and wherein rotational motion of the motor is transmitted to one of the first and second burrs via a transmission member.

9. The coffee grinding machine according to claim 1, wherein one of the first and second burrs is a male burr and the other of the first and second burrs is a female burr, and wherein the male burr is displaceable axially relative to the female burr via a rotatable adjustment member.

10. The coffee grinding machine according to claim 1, wherein a dose of ground coffee is prepared based on a predetermined number of revolutions of the motor and/or of the at least one of the first and second burrs that is rotatable.

11. The coffee grinding machine according to claim 1, further comprising a conveyor ring immediately downstream from the first and second burrs, a portion of the annular member being downstream of the conveyor ring, and the conveyor cone being downstream of the annular member.

12. The coffee grinding machine according to claim 1, wherein the axis of rotation of the at least one of the first and second burrs is aligned with a central axis of the annular member.

13. The coffee grinding machine according to claim 12, wherein the central axis of the annular member is aligned with a central axis of the conveyor cone.

* * * * *